United States Patent
Barzelay et al.

(10) Patent No.: US 12,299,821 B2
(45) Date of Patent: May 13, 2025

(54) SOLUTION OF BODY-GARMENT COLLISIONS IN AVATARS FOR IMMERSIVE REALITY APPLICATIONS

(71) Applicant: Meta Platforms Technologies, LLC, Menlo Park, CA (US)

(72) Inventors: Zohar Barzelay, Haifa (IL); Maxim Bluvshtein, Herzliya (IL)

(73) Assignee: Meta Platforms Technologies, LLC, Menlo Park, CA (US)

( * ) Notice: Subject to any disclaimer, the term of this patent is extended or adjusted under 35 U.S.C. 154(b) by 154 days.

(21) Appl. No.: 18/148,326

(22) Filed: Dec. 29, 2022

(65) Prior Publication Data

US 2024/0221318 A1 Jul. 4, 2024

(51) Int. Cl.
*G06T 19/00* (2011.01)
*G06N 3/08* (2023.01)
*G06T 15/06* (2011.01)

(52) U.S. Cl.
CPC .............. *G06T 19/00* (2013.01); *G06N 3/08* (2013.01); *G06T 15/06* (2013.01); *G06T 2210/16* (2013.01); *G06T 2210/21* (2013.01); *G06T 2210/22* (2013.01)

(58) Field of Classification Search
CPC ..................................................... G06T 19/00
See application file for complete search history.

(56) References Cited

U.S. PATENT DOCUMENTS

| | | | |
|---|---|---|---|
| 2021/0118239 A1* | 4/2021 | Santesteban | G06N 3/044 |
| 2022/0237879 A1* | 7/2022 | Wu | G06T 15/04 |
| 2022/0327709 A1* | 10/2022 | Dudovitch | G06F 18/2155 |

OTHER PUBLICATIONS

Baciu G., et al., "Image-Based Collision Detection for Deformable Cloth Models," IEEE Transactions on Visualization and Computer Graphics, Nov. 2004, vol. 10, No. 6, pp. 649-663.
Baciu G., et al., "RECODE: An Image-Based Collision Detection Algorithm," The Journal of Visualization and Computer Animation, Dec. 9, 1999, vol. 10, No. 4, pp. 181-192.
Myszkowski K., et al., "Fast Collision Detection between Complex Solids Using Rasterizing Graphics Hardware," The Visual Computer, Sep. 1995, vol. 11, No. 9, pp. 497-511.
Santesteban I., et al., "SNUG: Self-Supervised Neural Dynamic Garments," Proceedings of the IEEE/CVF Conference on Computer Vision and Pattern Recognition (CVPR), Apr. 5, 2022, pp. 8140-8150.
Tiwari L., et al., "DeepDraper: Fast and Accurate 3D Garment Draping over a 3D Human Body," Proceedings of the IEEE/CVF International Conference on Computer Vision (ICCV), Oct. 17, 2021, pp. 1416-1426.

* cited by examiner

*Primary Examiner* — Shivang I Patel
(74) *Attorney, Agent, or Firm* — Potomac Law Group, PLLC; Dannon G. Allbee

(57) ABSTRACT

A method for resolving body-garment collisions in avatars for immersive reality applications is provided. The method includes forming a two-dimensional projection of a dressed avatar in an immersive reality application running in a headset, identifying, from the two-dimensional projection, an area that includes a garment collision, and replacing a pixel in the area that includes the garment collision, with a pixel indicative of a garment for the dressed avatar, to form a new two-dimensional projection of the dressed avatar. A system and a non-transitory, computer-readable medium storing instructions to perform the above method, are also provided.

19 Claims, 12 Drawing Sheets

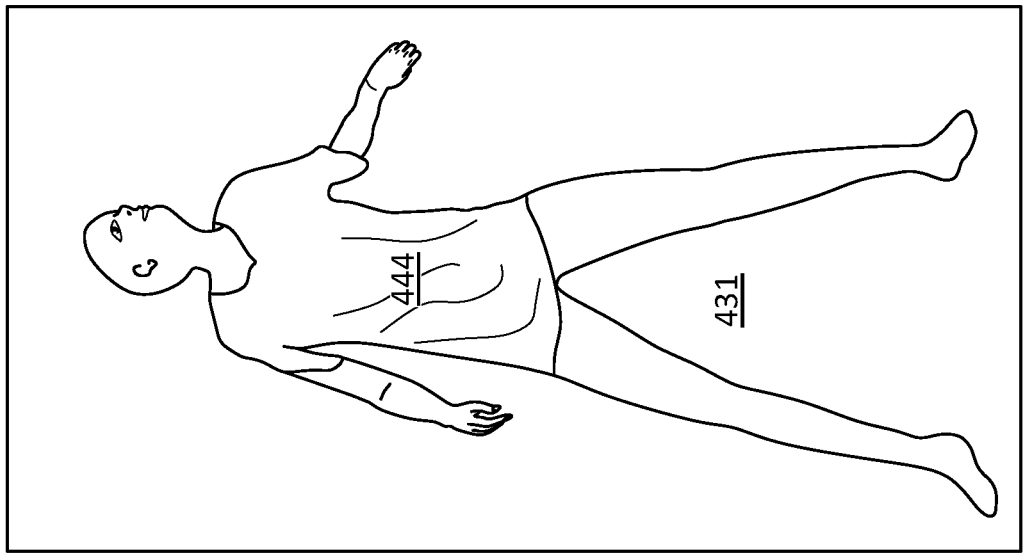
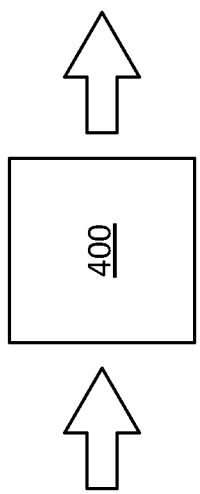
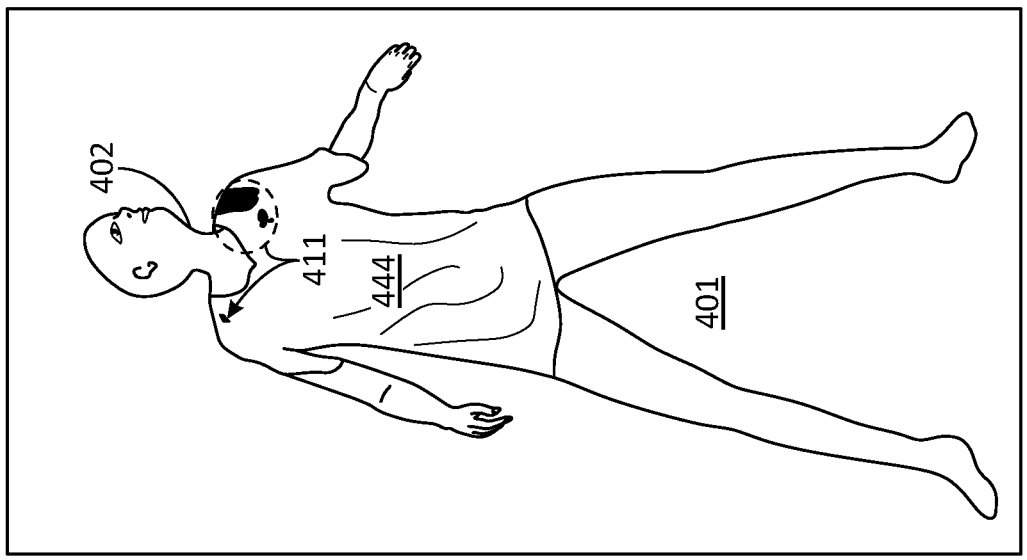
FIG. 4A

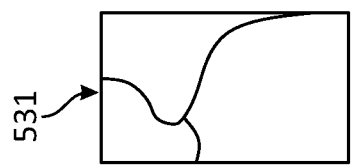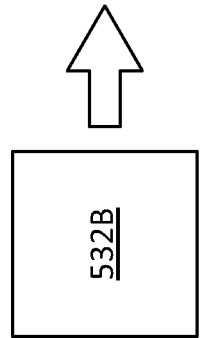
FIG. 5B

SOLUTION OF BODY-GARMENT COLLISIONS IN AVATARS FOR IMMERSIVE REALITY APPLICATIONS

BACKGROUND

Technical Field

The present disclosure is related to generating dressed avatars in virtual reality (VR) and augmented reality (AR) applications. More specifically, the present disclosure resolves body-garment collisions for VR/AR applications in real time.

Related Art

In the field of VR/AR real-time garment draping, body-garment collisions are not infrequent. Resolving such occurrences is possible to a high degree of accuracy using three-dimensional meshes rendered for the garment and the subject body in the avatar. However, these approaches involve heavy computation that are currently not feasible in real time.

SUMMARY

In a first embodiment, a computer-implemented method includes forming a two-dimensional projection of a dressed avatar in an immersive reality application running in a headset, identifying, from the two-dimensional projection, an area that includes a garment collision, and replacing a pixel in the area that includes the garment collision, with a pixel indicative of a garment for the dressed avatar, to form a new two-dimensional projection of the dressed avatar.

In a second embodiment, a system includes a memory storing multiple instructions and one or more processors configured to execute the instructions to cause the system to perform operations. The operations include to form a two-dimensional projection of a dressed avatar in an immersive reality application running in a headset, to identify, from the two-dimensional projection, an area that includes a garment collision, and to replace a pixel in the area that includes the garment collision, with a pixel indicative of a garment for the dressed avatar, to form a new two-dimensional projection of the dressed avatar.

In a third embodiment, a computer-implemented method for training a model to remove garment collisions in a virtual reality headset includes collecting multiple images of a dressed avatar, each of the images having at least one known garment collision, identifying, with the model, a selected area of each of the images that contains the garment collision, modifying a first feature in the model when at least one pixel of the at least one known garment collision is not included in the selected area, and modifying a second feature in the model when at least one pixel in the selected area is not part of at least one garment collision.

In another embodiment, a non-transitory, computer-readable medium stores instructions which, when executed by a processor in a computer, cause the computer to perform a method. The method includes forming a two-dimensional projection of a dressed avatar in an immersive reality application running in a headset, identifying, from the two-dimensional projection, an area that includes a garment collision, generating a mask for multiple pixels in the area that includes the garment collision, wherein at least one pixel in the mask has a value indicative of a lack of a garment portion, and replacing, in a new two-dimensional projection of the dressed avatar, a pixel having a binary value indicative of the lack of the garment portion with a pixel that is included in the garment portion.

In another embodiment, a system includes a first means to store instructions and a second means to execute the instructions to cause the system to perform a method. The method includes forming a two-dimensional projection of a dressed avatar in an immersive reality application running in a headset, identifying, from the two-dimensional projection, an area that includes a garment collision, generating a mask for multiple pixels in the area that includes the garment collision, wherein at least one pixel in the mask has a value indicative of a lack of a garment portion, and replacing, in a new two-dimensional projection of the dressed avatar, a pixel having a binary value indicative of the lack of the garment portion with a pixel that is included in the garment portion.

In yet another embodiment, a system includes a first means to store instructions and a second means to execute the instructions to cause the system to perform a method. The method includes forming a two-dimensional projection of a dressed avatar in an immersive reality application running in a headset, identifying, from the two-dimensional projection, an area that includes a garment collision, and replacing a pixel in the area that includes the garment collision with a pixel indicative of a garment for the dressed avatar to form a new two-dimensional projection of the dressed avatar.

These and other embodiments will be clear to one of ordinary skill in the art, in view of the following.

BRIEF DESCRIPTION OF THE FIGURES

FIGS. 4A-4B illustrate a sequence for training a neural network for creating a mask over garment collisions in an avatar, according to some embodiments.

FIGS. 5A-5B illustrate a sequence for cropping an area of interest in an image projection of a dressed avatar, according to some embodiments.

In the figures, like elements are labeled likewise, according to their description, unless explicitly stated otherwise.

DETAILED DESCRIPTION OF THE FIGURES

Figure 1:
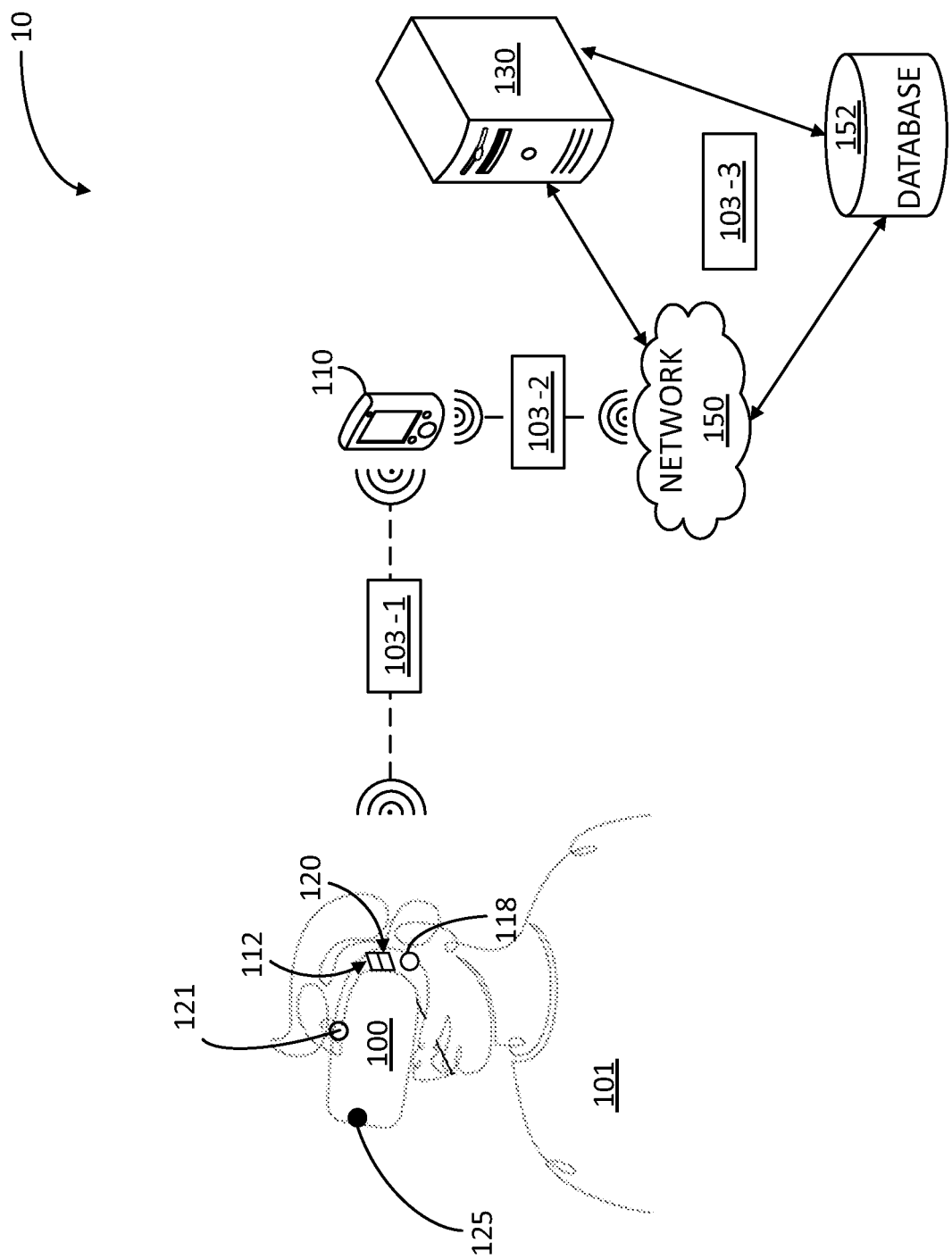
FIG. 1 illustrates an example architecture suitable for providing a real-time, clothed subject animation in a virtual reality environment, according to some embodiments.

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

General Overview

In the metaverse, users express themselves by wearing different clothes on their avatars. For a successful immersive experience, realistic rendering of clothed avatars with high fidelity is desirable. However, the limited availability of computer power hinders this goal. Current machine learning (ML) clothing methods tend to wrongly dispose garments and body locations that intersect with each other at some points (e.g., "collide"), resulting in obvious, unrealistic errors. Typically, ML-clothing techniques train on ground-truth datasets of realistic body-meshes for physical simulations results. Accordingly, for each collision there exists a ground-truth correct configuration that can be incorporated into a loss function to resolve the collision problem.

Therefore, currently available ML methods apply lengthy post-processing steps to identify and correct garment and body mesh collisions. These steps are compute-intensive and inhibit the usage of such ML methods in real-time immersive applications. Accordingly, it is desirable to have computer-efficient approaches to solve clothing and body collisions for real-time metaverse personalized fashion experiences.

To solve the above technical problem arising in the field of immersive reality applications for computer networks, embodiments as disclosed herein implement an ML classification step to identify well defined areas of an image including a collision artifact by learning to classify bad ML predictions. Further, some embodiments include resolving the collision artifacts in the image-domain, rather than in the 3D mesh domain and training a module to fix the ML-clothing predictions. For example, ML-clothing methods predict the locations of the body and garment meshes, which are rendered on a two-dimensional (2D) headset display, for the user. Accordingly, collision artifacts can be resolved in a 2D space, for a single rendered image.

In some embodiments, a three-dimensional (3D) mesh collision problem is solved with a 2D supervised pixel classification ML model based on a given user viewpoint. The simplicity of the approach enables real-time rendering of avatars' clothed bodies, for an immersive user experience.

In some embodiments, a supervised per-pixel classification solution is provided in 2D. A training set including a body, a garment position, a camera position, and a created image is used in an ML-draping model to estimate a second body position and garment position to be used for animation of a dressed avatar in an immersive reality application. The second body position and the second garment position may include collision artifacts. The model is trained to identify artifacts in the second image based on the first image as a binary mask, indicating the pixels in the second image where the garment should replace the body. Accordingly, the model creates a new 2D image that no longer depicts collisions from the point of view of the user.

Example System Architecture

FIG. 1 illustrates an architecture 10 for immersive reality applications including a headset 100, a mobile device 110, a remote server 130 and a database 152, according to some embodiments. Headset 100 may be a VR/AR headset running an immersive reality application, and mobile device 110 may be a smart phone with a user 101 of headset 100. Headset 100, mobile device 110, server 130 and database 152 may communicate with one another via a communications module 118 and exchange a first dataset 103-1. In some embodiments, communications module 118 can include, for example, radio-frequency hardware (e.g., antennas, filters, analog to digital converters, and the like) and software (e.g., signal processing software). Dataset 103-1 may include a video or a rendering of an immersive reality environment, or a view of a gesture, face, or gaze direction of user 101. In some embodiments, user 101 is also the owner or is associated with mobile device 110. In some embodiments, headset 100 may directly communicate with remote server 130, database 152, or any other client device (e.g., a smart phone of a different user, and the like) via a network 150.

Mobile device 110 may be communicatively coupled with remote server 130 and database 152 via network 150, and transmit/share information, files, and the like with one another (e.g., dataset 103-2 and dataset 103-3). Datasets 103-1, 103-2, and 103-3 will be collectively referred to, hereinafter, as "datasets 103." In some embodiments, headset 100 may include multiple sensors 121 such as inertial measurement units (IMUs), gyroscopes, microphones, cameras, and the like mounted within the frame of headset 100. Other sensors 121 that can be included in the wearable devices 100 may be magnetometers, photodiodes and cameras, touch sensors, and other electromagnetic devices such as capacitive sensors, a pressure sensor, and the like. Headset 100 may also include a microphone 125. Accordingly, datasets 103 may include signals that locate a user 101 within the immersive reality application, including the user's point of view of an avatar.

In addition, headset 100, and any other wearable device 100, or mobile device 110 may include a memory circuit 120 storing instructions, and a processor circuit 112 configured to execute the instructions to cause headset 100 to perform, at least partially, some of the steps in methods consistent with the present disclosure. Headset 100 may be downstreaming a virtual reality environment from server 130 including dressed avatars from other participants in the immersive reality environment. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

In some embodiments, memory circuit 120 may store instructions which, when executed by processor 112, cause the combination components to remove a garment collision for an avatar in the immersive reality application.

Figure 2:
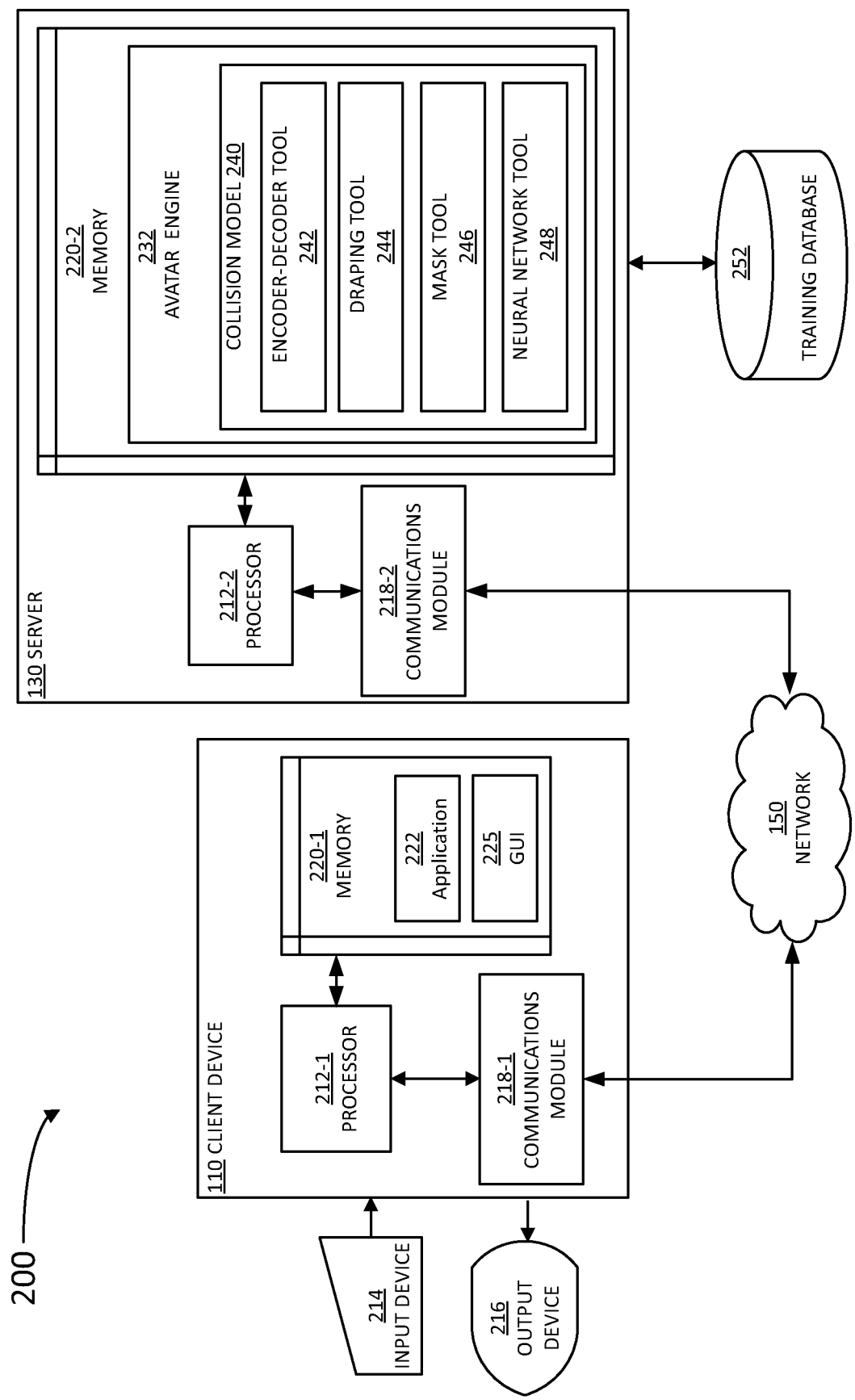
FIG. 2 is a block diagram illustrating an example server and client from the architecture of FIG. 1, according to certain aspects of the disclosure.

FIG. 2 is a block diagram 200 illustrating an example server 130 and client device 110 from architecture 100, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices via network 150. Communications modules 218 can be, for example, modems or Ethernet cards, and may include radio hardware and software for wireless communications (e.g., via electromagnetic radiation, such as radiofrequency -RF-, near field communications -NFC-, Wi-Fi, and Bluetooth radio technology). A user may interact with client device 110 via an input device 214 and an output device 216. Input device 214 may include a mouse, a keyboard, a pointer, a touchscreen, a microphone, a joystick, a virtual joystick, and the like. In some embodiments, input device 214 may include cameras, microphones, and sensors, such as touch sensors, acoustic sensors, inertial motion units -IMUs- and other sensors configured to provide input data to a VR/AR headset. For example, in some embodiments, input device 214 may include an eye tracking device to detect the position and gaze direction of a user's pupil in a VR/AR headset. Output device 216 may be a screen display, a touchscreen, a speaker, and the like. Client device 110 may include a memory 220-1 and a processor 212-1. Memory 220-1 may include an application 222 and a GUI 225, configured to run in client device 110 and couple with input device 214 and output device 216. Application 222 may be downloaded by the user from server 130 and may be hosted by server 130. In some embodiments, client device 110 is a VR/AR headset and application 222 is an immersive reality application.

Server 130 includes a memory 220-2, a processor 212-2, and communications module 218-2. Hereinafter, processors 212-1 and 212-2, and memories 220-1 and 220-2, will be collectively referred to, respectively, as "processors 212" and "memories 220." Processors 212 are configured to execute instructions stored in memories 220. In some embodiments, memory 220-2 includes an avatar engine 232. Avatar engine 232 may share or provide features and resources to GUI 225, including multiple tools associated with training and using a three-dimensional avatar rendering model and a collision model 240 for immersive reality applications (e.g., application 222). The user may access avatar engine 232 through application 222, installed in a memory 220-1 of client device 110. Accordingly, application 222, including GUI 225, may be installed by server 130 and perform scripts and other routines provided by server 130 through any one of multiple tools. Execution of application 222 may be controlled by processor 212-1.

In that regard, avatar engine 232 may be configured to create, store, update, and maintain a collision model 240, as disclosed herein. Collision model 240 may include an encoder-decoder tool 242, a draping tool 244, a mask tool 246, and a neural network tool 248. Encoder-decoder tool 242 collects input images with multiple, simultaneous views of a subject and extracts pixel-aligned features to condition draping tool 244 and identify garment collisions with mask tool 246. Collision model 240 can generate novel views of unseen subjects from one or more sample images processed by encoder-decoder tool 242. In some embodiments, encoder-decoder tool 242 is a shallow (e.g., including a few one- or two-node layers) convolutional network. In some embodiments, mask tool 246 identifies garment collisions and creates a mask that can be overlapped on a 2D projection of a subject avatar.

Neural network tool 248 may include algorithms trained for the specific purposes of the engines and tools included therein. The algorithms may include machine learning or artificial intelligence algorithms making use of any linear or non-linear algorithm, such as a neural network algorithm, or multivariate regression algorithm. In some embodiments, the machine learning model may include a neural network (NN), a convolutional neural network (CNN), a generative adversarial neural network (GAN), a deep reinforcement learning (DRL) algorithm, a deep recurrent neural network (DRNN), a classic machine learning algorithm such as random forest, k-nearest neighbor (KNN) algorithm, k-means clustering algorithms, or any combination thereof.

More generally, the machine learning model may include any machine learning model involving a training step and an optimization step. In some embodiments, training database 252 may include a training archive to modify coefficients according to a desired outcome of the machine learning model. Accordingly, in some embodiments, neural network tool 248 is configured to access training database 252 to retrieve documents and archives as inputs for the machine learning model.

In some embodiments, avatar engine 232, the tools contained therein, and at least part of training database 252 may be hosted in a different server that is accessible by server 130 or client device 110. In some embodiments, avatar engine 232 may access one or more machine learning models stored in a training database 252. Training database 252 includes training archives and other data files that may be used by avatar engine 232 in the training of a machine learning model, according to the input of the user through application 222. Moreover, in some embodiments, at least one or more training archives or machine learning models may be stored in either one of memories 220 and the user may have access to them through application 222.

Figure 3:
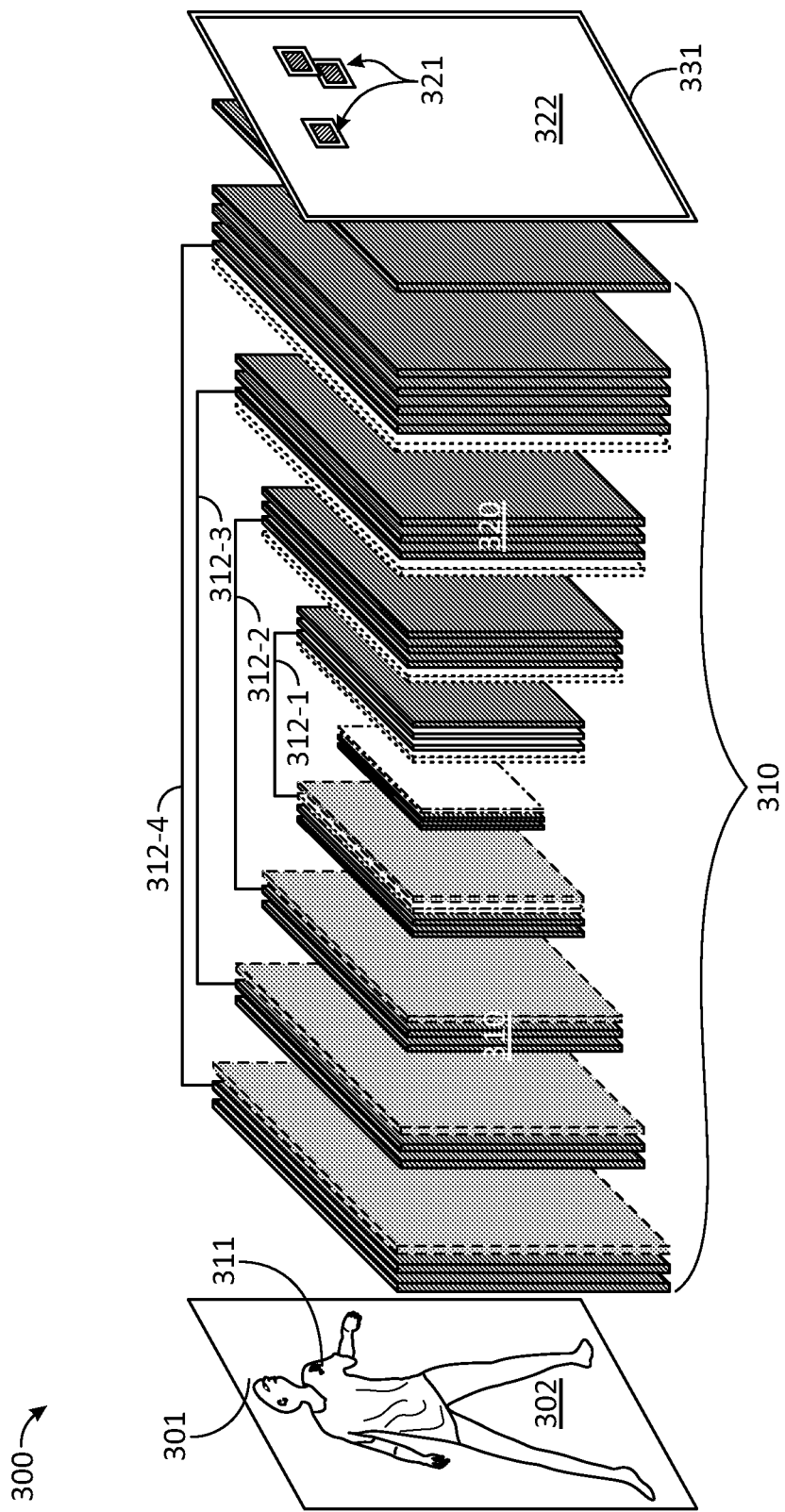
FIG. 3 illustrates an architecture for a neural network tool to identify garment collisions, according to some embodiments.

FIG. 3 illustrates an architecture for a neural network 300 to identify garment collisions (cf. neural network tool 248), according to some embodiments. A two-dimensional input image 301 is a projection along a given point of view of a dressed avatar 302 having garment collisions 311, and NN 300 generates a mask 331 that includes pixels having binary values (e.g., 0 and 1), wherein a first value 321 indicates a body portion of avatar 302 wherein a garment portion should be included. A second value 322 indicates the absence of a garment collision.

NN 300 may include down-sampling convolutional steps 310 concatenated with up-sampling steps 320 in concatenation stages 312-1, 312-2, 312-3 and 312-4.

Figure 4B:
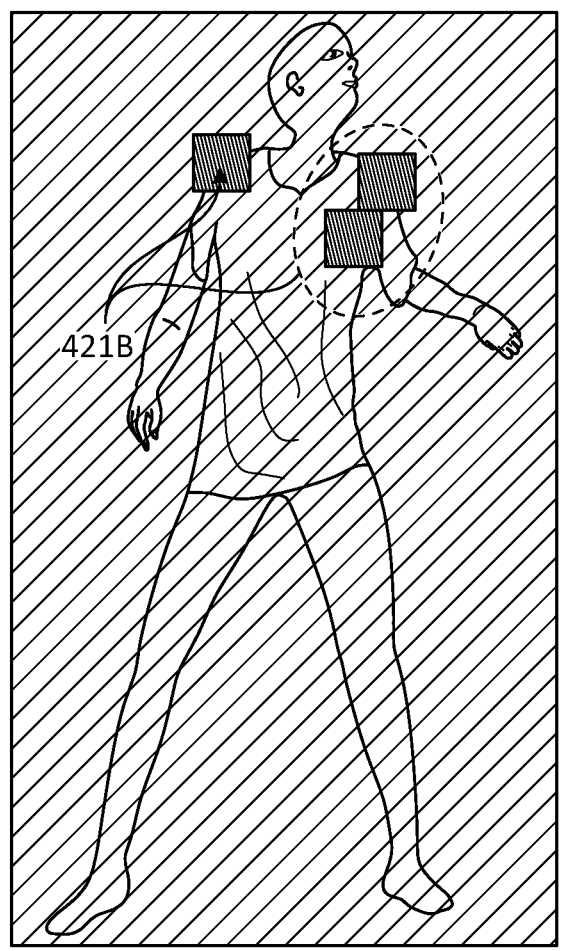

FIGS. 4A-4B illustrate a sequence for training a neural network 400 for creating a mask 431 over garment collisions 411 in an avatar 402, according to some embodiments. An input image 401 along a selected point of view includes garment collisions 411, wherein the body of avatar 402 overlaps a garment 444. Neural network 400 may be a 2D to 2D network, and produces a mask 431B to create an image output 431A wherein garment collisions have been replaced by clothing 444, as desired.

In some embodiments, NN 400 uses a physics simulation as ground-truth, to deduce mask output 431. NN 400 is trained to classify pixels with collisions as "1," and without collision as "0." NN 400 takes, as input, multiple images 401 (e.g., taken from the output of an ML-draping algorithm) each paired with a mask 431B that includes labeled pixels 421B. The training pairs (401, 431) may be generated by using multiple body shapes, multiple poses, and multiple viewing angles.

Figure 5A:
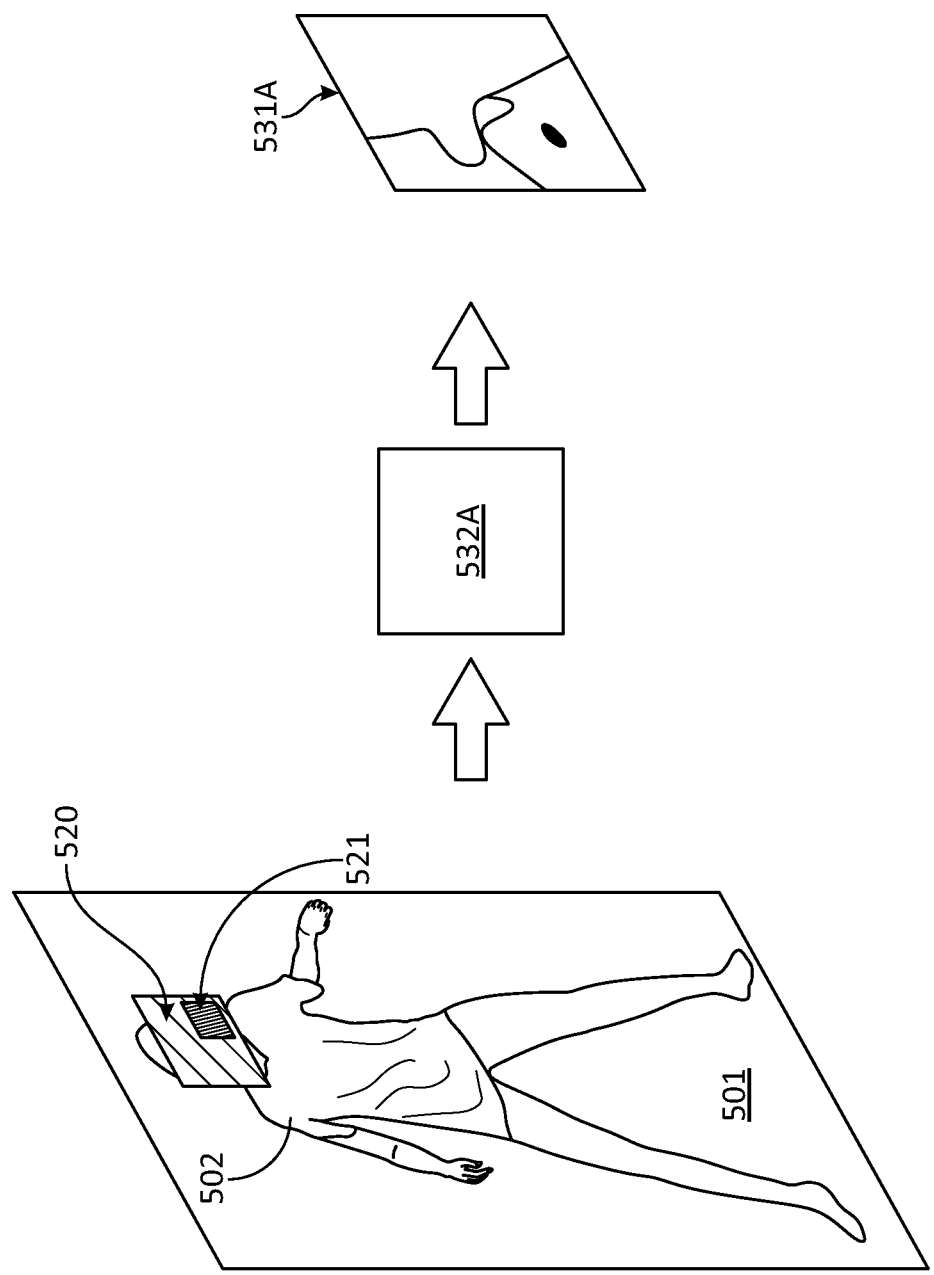

FIGS. 5A-5B illustrate a sequence for cropping an area of interest 520 in an image projection 501 of a dressed avatar 502, according to some embodiments. Area of interest 520 includes garment collision pixels 521. Because the rest of the area in image 501 is collision-free, avatar engine 532A crops the image, so the computational burden is substantially reduced. A cropped image 531A is used as input in avatar engine 532B (which may be the same, but a different processing block as avatar engine 532A), to generate a collision free projection 531. Finally, projection 531 is combined with the rest of the cropped projection 501 to provide a fully dressed (e.g., collision free) avatar image.

Figure 6:
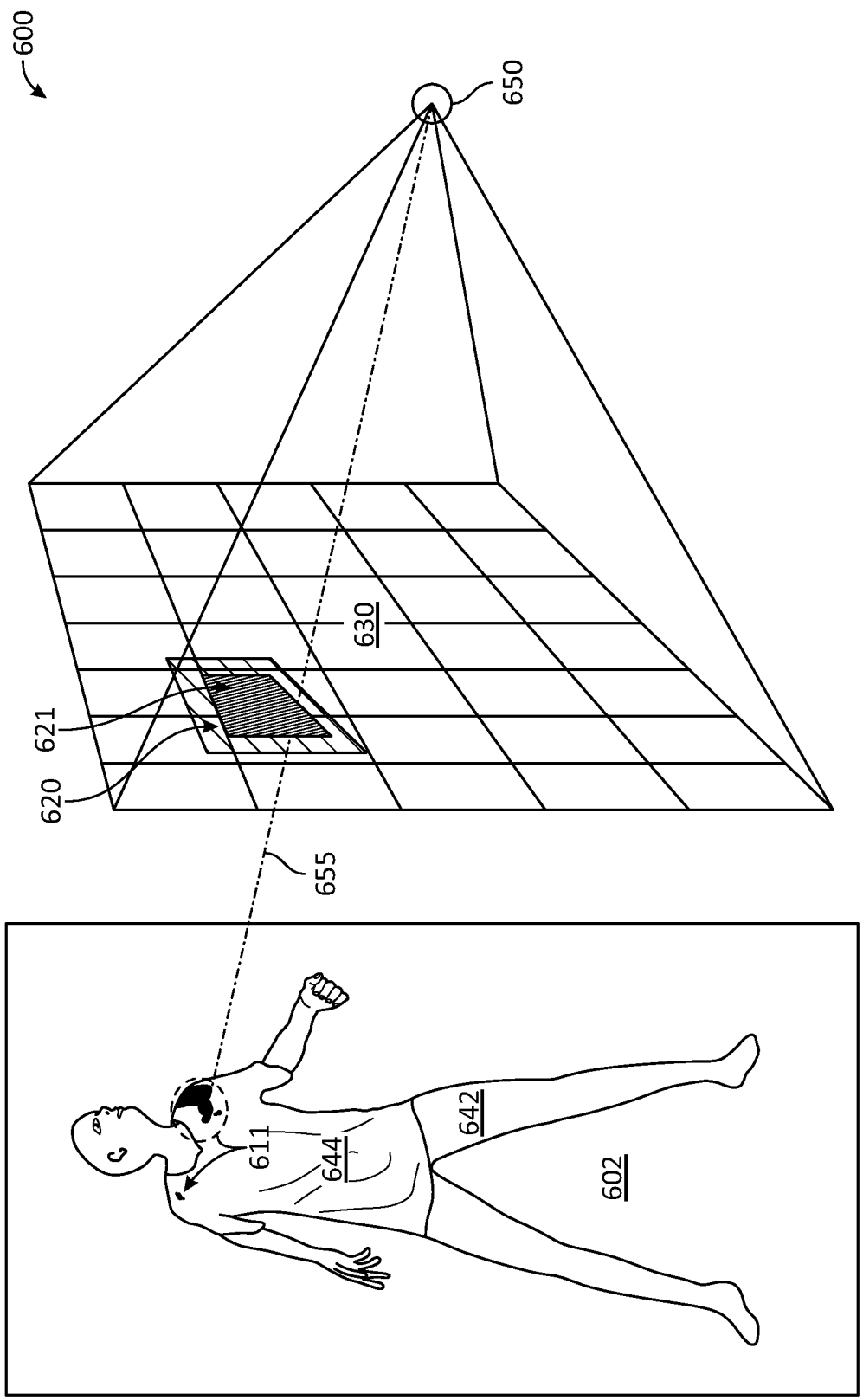
FIG. 6 illustrates a ray marching process for resolving a garment collision in a 3D domain, according to some embodiments.

FIG. 6 illustrates a ray marching process 600 for resolving a garment collision in a 3D domain, according to some embodiments. An avatar model 602 includes collisions 611 between a body model 642 and a garment model 644. Collisions 611 are 3D objects having a volume. Assuming the physics of an immersive reality scene is known (specifically, the viewing direction of the user/camera, the intrinsic and extrinsic parameters, and the like), a point 650 may be selected as a point of view (e.g., camera's center, a user's pupil, and the like). Given a point 650, each pixel on a 2D projection 630 of avatar 602 includes at most one ray 655 starting in point of view 650 and ending within avatar 602. For each of the rays 655, the method includes identifying whether the first contact with avatar 602 (when marching from point 650, through projection 630, and through avatar 602) is a body portion or a garment portion. If ray 655, proceeding in the above sequence includes a sequence of points: body-garment-body, then the first body-garment transition is identified as part of a garment-collision volume. The projection 620 of the garment-collision volume on projection 630 is then the 2D collision area to resolve, and includes a pixel 621 that masks collisions 611.

Figure 7:
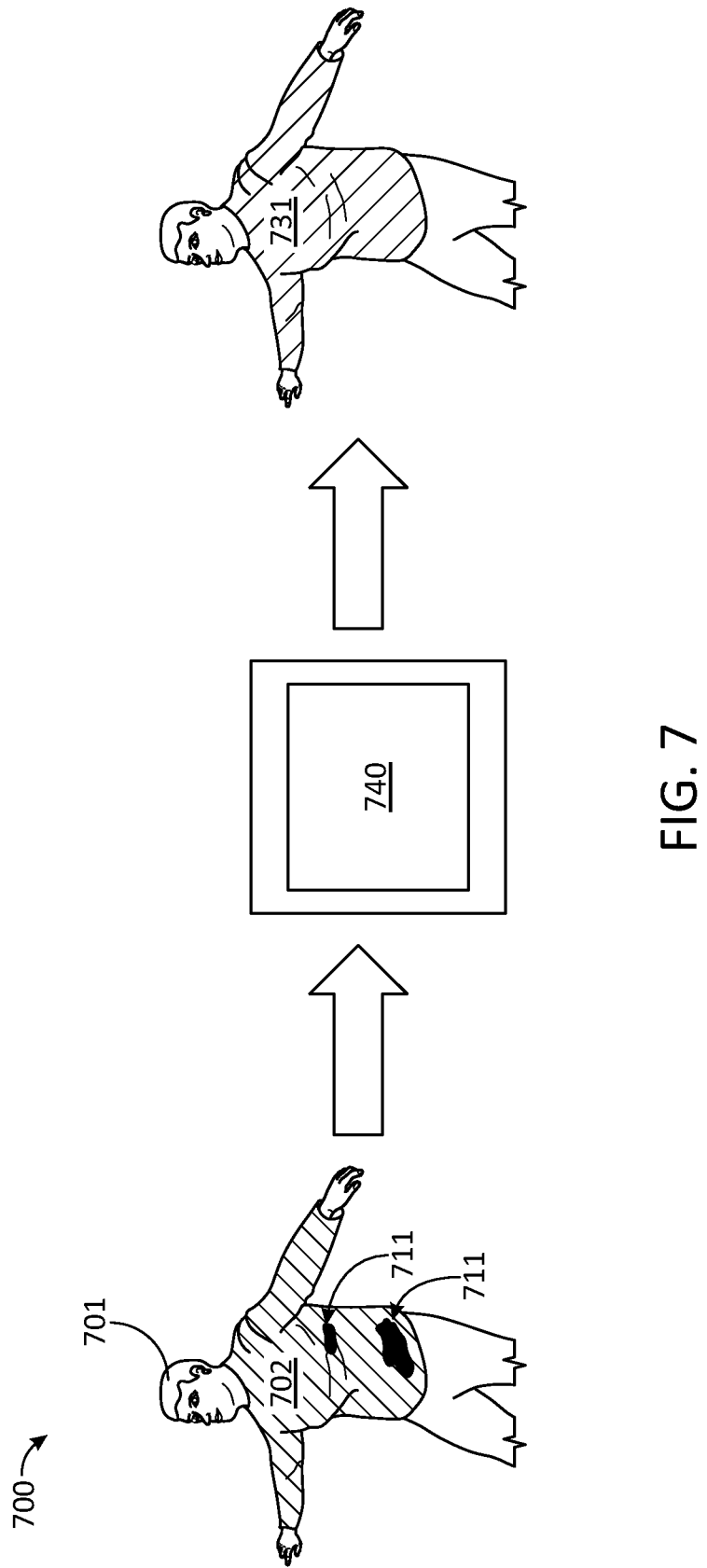
FIG. 7 illustrates a resolution of a garment collision with a 2D model, according to some embodiments.

FIG. 7 illustrates a resolution 700 of a garment collision with a 2D model 740, according to some embodiments. 2D model 740 identifies collision areas 711 in a 2D image 701 of a dressed avatar 702. Performing operations on the pixels within collision areas 711 (e.g., replacing, recoloring, or merging with the garment), 2D model 740 provides a fully dressed image 731 of avatar 702.

Figure 8:
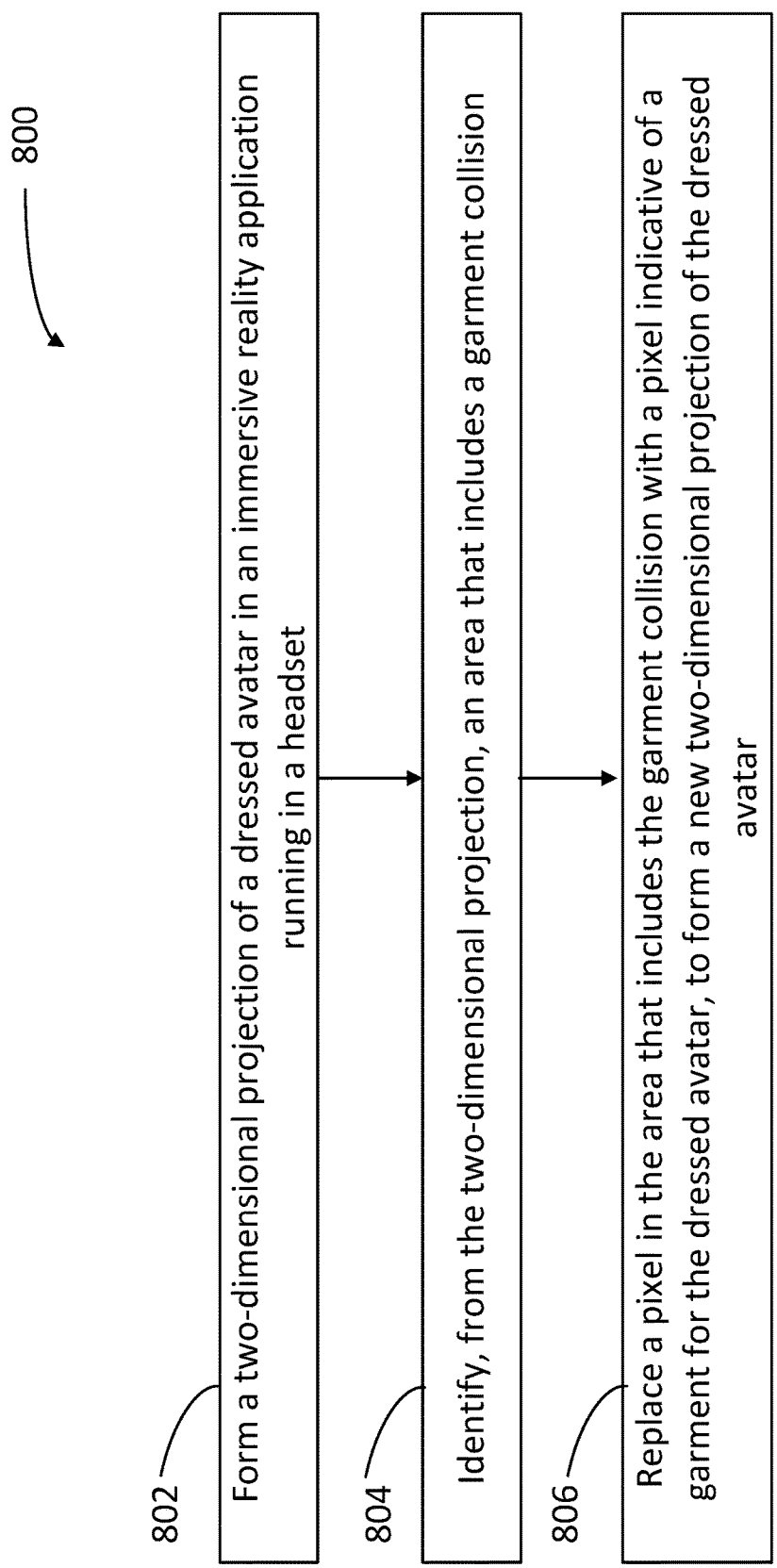
FIG. 8 illustrates a flowchart in a method for resolving body-garment collisions for avatars in an immersive application, according to some embodiments.

FIG. 8 illustrates a flowchart in a method 800 for resolving body-garment collisions for avatars in an immersive application, according to some embodiments. In some embodiments, at least one step in method 800 may be performed by a processor executing instructions stored in a memory of a computer system in a VR/AR headset, a mobile device, a remote server or a database, communicatively coupled through a network via a communications module (cf. VR/AR headset 100, mobile device 110, server 130, database 152, processor 112, memory 120, communications module 118, and network 150). The memory may include instructions to run an immersive reality application and interact with the user via a GUI, or an avatar engine including a collision model, an encoder-decoder tool, a draping tool, a mask tool, and a neural network tool, as disclosed herein (cf. application 222, GUI 225, avatar engine 232, collision model 240, encoder-decoder tool 242, draping tool 244, mask tool 246, and neural network tool 248). Methods consistent with the present disclosure may include at least one or more of the steps in method 800 performed in a different order, simultaneously, quasi-simultaneously, or overlapping in time.

Step 802 includes forming a two-dimensional projection of a dressed avatar in an immersive reality application running in a headset. In some embodiments, step 802 includes selecting the two-dimensional projection along a direction of view of a user of the headset, based on the immersive reality application.

Step 804 includes identifying, from the two-dimensional projection, an area that includes a garment collision. In some embodiments, step 804 includes running a two-dimensional model trained to identify a garment collision on the two-dimensional projection of the dressed avatar. In some embodiments, step 804 includes cropping one or more portions of the two-dimensional projection, each of the one or more portions including multiple adjacent pixels with a value indicative of a lack of the garment portion. In some embodiments, step 804 includes cropping the two-dimensional projection around the area that includes the garment collision to form a reduced image input, and applying a two-dimensional model to the reduced image input for replacing the first pixel having the binary value indicative of the lack of the garment portion. In some embodiments, step 804 includes generating a mask for multiple pixels in the area that includes the garment collision, wherein at least one pixel in the mask has a value indicative of a lack of a garment portion. In some embodiments, step 806 includes predicting, for each pixel, a likelihood that the pixel indicates a body portion, based on a pixel value and at least an adjacent pixel value.

Step 808 includes replacing a pixel in the area that includes the garment collision with a pixel indicative of a garment for the dressed avatar, to form a new two-dimensional projection of the dressed avatar. In some embodiments, step 808 includes determining a color value and a shade value for the first pixel, based on a two-dimensional garment model that includes the garment portion. In some embodiments, step 808 includes resolving an overlap between a three-dimensional garment model and a three-dimensional body model, and projecting an updated three-dimensional garment model on the new two-dimensional projection of the dressed avatar. In some embodiments, step 808 includes replacing the garment portion using a two-dimensional garment model. In some embodiments, step 808 includes coloring the first pixel according to an average color of a garment in an area adjacent to the area of the garment collision.

Figure 9:
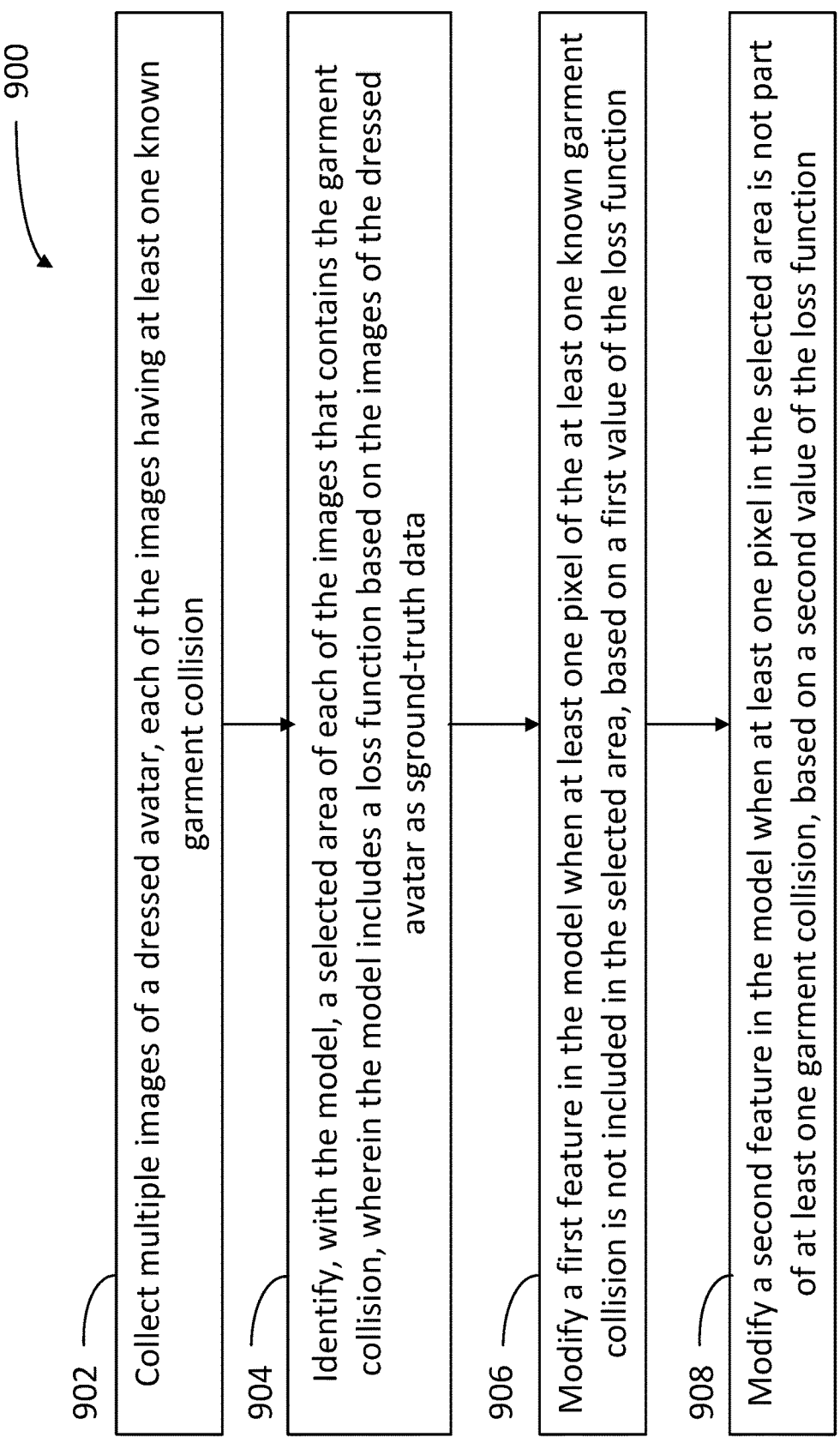
FIG. 9 illustrates a flowchart in a method for training a neural network to identify and resolve body-garment collisions for avatars in immersive applications, according to some embodiments.

FIG. 9 illustrates a flowchart in a method 900 for training a neural network to identify and resolve body-garment collisions for avatars in immersive applications, according to some embodiments. In some embodiments, at least one step in method 900 may be performed by a processor executing instructions stored in a memory of a computer system in a VR/AR headset, a mobile device, a remote server or a database, communicatively coupled through a network via a communications module (cf. VR/AR headset 100, mobile device 110, server 130, database 152, processor 112, memory 120, communications module 118, and network 150). The memory may include instructions to run an immersive reality application and interact with the user via a GUI, or an avatar engine including a collision model, an encoder-decoder tool, a draping tool, a mask tool, and a neural network tool, as disclosed herein (cf. application 222, GUI 225, avatar engine 232, collision model 240, encoder-decoder tool 242, draping tool 244, mask tool 246, and neural network tool 248). Methods consistent with the present disclosure may include at least one or more of the steps in method 900 performed in a different order, simultaneously, quasi-simultaneously, or overlapping in time.

Step 902 includes collecting multiple images of a dressed avatar, each of the images having at least one known garment collision. In some embodiments, step 902 includes collecting images with different body shapes, different poses, and different viewing angles. In some embodiments, step 902 includes projecting the dressed avatar on a two-dimensional plane along a point of view of an observer in an immersive reality application. In some embodiments, step 902 includes generating a three-dimensional model for a garment of an avatar body that overlaps the avatar body in a finite volume.

Step 904 includes identifying, with the model, a selected area of each of the images that contains the garment collision, wherein the model includes a loss function including the images of the dressed avatar as ground truth data. In some embodiments, the ground-truth data used in the model may include physics simulations of a dressed avatar.

Step 906 includes identifying a first coefficient in the model when at least one pixel of the at least one known garment collision is not included in the selected area.

Step 908 includes modifying a second coefficient in the model when at least one pixel in the selected area is not part of at least one garment collision. In some embodiments, step 908 includes defining a loss function for each pixel in the selected area. In some embodiments, step 908 includes projecting a three-dimensional garment model to form a two-dimensional garment view along a selected point of view to update the at least one pixel in the selected area based on the two-dimensional garment view. In some embodiments, step 908 includes verifying that the at least one pixel of the at least one known garment collision is not included in the selected area when a selected point of view of the dressed avatar is modified.

Hardware Overview

Figure 10:
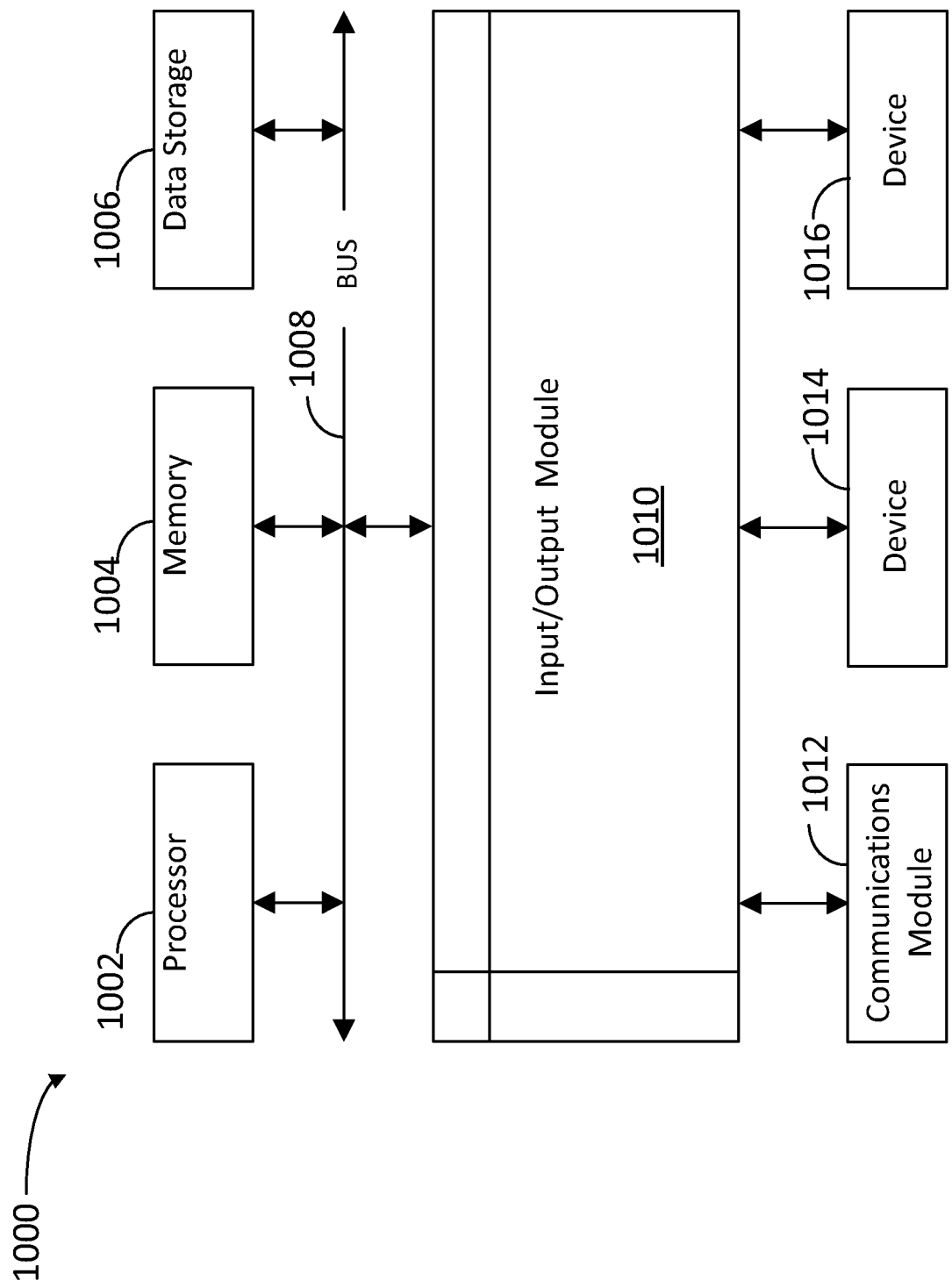
FIG. 10 illustrates a computer system configured to perform at least some of the methods of FIGS. 8-9, according to some embodiments.

FIG. 10 is a block diagram illustrating an exemplary computer system 1000 with which headsets and other client devices 110, and methods 800 and 900 can be implemented. In certain aspects, computer system 1000 may be implemented using hardware or a combination of software and hardware, either in a dedicated server, or integrated into another entity, or distributed across multiple entities. Computer system 1000 may include a desktop computer, a laptop computer, a tablet, a phablet, a smartphone, a feature phone, a server computer, or otherwise. A server computer may be located remotely in a data center or be stored locally.

Computer system 1000 includes a bus 1008 or other communication mechanism for communicating information, and a processor 1002 (e.g., processors 212) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, e.g., one or more modules of computer program instructions encoded on a computer-readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled with bus 1008 for storing information and instructions. Computer system 1000 may be coupled via input/output module 1010 to various devices. Input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, input/output module 1010 is configured to connect to a plurality of devices, such as an input device 1014 and/or an output device 1016. Exemplary input devices 1014 include a keyboard and a pointing device, e.g., a mouse or a trackball, by which a consumer can provide input to the computer system 1000. Other kinds of input devices 1014 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 1016 include display devices, such as an LCD (liquid crystal display) monitor, for displaying information to the consumer.

According to one aspect of the present disclosure, headsets and client devices 110 can be implemented, at least partially, using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires forming bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
   forming a two-dimensional projection of a dressed avatar in an immersive reality application running in a headset;
   identifying, from the two-dimensional projection, an area that includes a garment collision;
   cropping the two-dimensional projection around the area that includes the garment collision to form a reduced image input; and
   replacing a pixel in the reduced image input with a pixel indicative of a garment for the dressed avatar, to form a new two-dimensional projection of the dressed avatar.

2. The computer-implemented method of claim 1, wherein forming a two-dimensional projection of a dressed avatar comprises selecting the two-dimensional projection along a direction of view of a user of the headset, based on the immersive reality application.

3. The computer-implemented method of claim 1, wherein identifying an area that includes a garment collision comprises running a two-dimensional model trained to identify a garment collision on the two-dimensional projection of the dressed avatar.

4. The computer-implemented method of claim 1, wherein identifying an area that includes a garment collision comprises cropping one or more portions of the two-dimensional projection, each of the one or more portions including multiple adjacent pixels with a value indicative of a lack of garment.

5. The computer-implemented method of claim 1, further comprising applying a two-dimensional model to the reduced image input for replacing the pixel in the area that includes the garment collision.

6. The computer-implemented method of claim 1, wherein generating a mask for multiple pixels in the area comprises predicting, for each pixel, a likelihood that the pixel indicates a body portion, based on a pixel value and at least an adjacent pixel value.

7. The computer-implemented method of claim 1, wherein replacing the pixel in the area that includes the garment collision comprises determining a color value and a shade value for the pixel, based on a two-dimensional garment model that includes a garment.

8. The computer-implemented method of claim 1, wherein replacing the pixel in the area that includes the garment collision comprises replacing a garment portion using a two-dimensional garment model.

9. The computer-implemented method of claim 1, wherein replacing the pixel in the area that includes the garment collision comprises coloring the pixel according to an average color of a garment in an area adjacent to the area of the garment collision.

10. The computer-implemented method of claim 1, wherein replacing the pixel in the area that includes the garment collision comprises resolving an overlap between a three-dimensional garment model and a three-dimensional body model, and projecting an updated three-dimensional garment model on the new two-dimensional projection of the dressed avatar.

11. The computer-implemented method of claim 1, wherein replacing the pixel in the area that includes the garment collision comprises:
    propagating a ray along a point of view in the immersive reality application, in a direction of a pixel in the area that includes the garment collision, and removing a portion of a three-dimensional body model intersected by the ray; and
    resolving a three-dimensional garment model with an updated three-dimensional body model.

12. A system, comprising:
a memory storing multiple instructions; and
one or more processors configured to execute the instructions to cause the system to:
  form a two-dimensional projection of a dressed avatar in an immersive reality application running in a headset;
  identify, from the two-dimensional projection, an area that includes a garment collision;
  crop the two-dimensional projection around the area that includes the garment collision to form a reduced image input; and
  replace a pixel in the reduced image input, with a pixel indicative of a garment for the dressed avatar, to form a new two-dimensional projection of the dressed avatar.

13. The system of claim 12 wherein to replace a pixel having a binary value indicative of a lack of garment, the one or more processors further execute instructions to:
  propagate a ray along appoint of view in the immersive reality application, in a direction of the pixel in the area that includes the garment collision, and remove a portion of a three-dimensional body model intersected by the ray; and
  resolve a three-dimensional garment model with an updated three-dimensional body model.

14. A computer-implemented method for training a model to remove garment collisions in a virtual reality headset, comprising:
  collecting multiple images of a dressed avatar, each of the images having at least one known garment collision;
  identifying, with the model, a selected area of each of the images that contains the garment collision, wherein the model includes a loss function based on the images of the dressed avatar as a ground-truth data;
  modifying a first feature in the model when at least one pixel of the at least one known garment collision is not included in the selected area; and
  modifying a second feature in the model when at least one pixel in the selected area is not part of at least one garment collision, wherein modifying the first feature and the second feature comprises defining a loss function for each pixel in the selected area.

15. The computer-implemented method of claim 14, wherein collecting multiple images of the dressed avatar comprises collecting images with different body shapes, different poses, and different viewing angles.

16. The computer-implemented method of claim 14, wherein collecting multiple images of the dressed avatar comprises projecting the dressed avatar on a two-dimensional plane along a point of view of an observer in an immersive reality application.

17. The computer-implemented method of claim 14, wherein collecting multiple images of the dressed avatar comprises generating a three-dimensional model for a garment of an avatar body that overlaps the avatar body in a finite volume.

18. The computer-implemented method of claim 14, wherein modifying the second feature in the model comprises projecting a three-dimensional garment model to form a two-dimensional garment view along a selected point of view to update the at least one pixel in the selected area based on the two-dimensional garment view.

19. The computer-implemented method of claim 14, wherein modifying a first coefficient in the model comprises verifying that the at least one pixel of the at least one known garment collision is not included in the selected area when a selected point of view of the dressed avatar is modified.

* * * * *